(12) United States Patent
Masuda

(10) Patent No.: US 6,331,929 B1
(45) Date of Patent: Dec. 18, 2001

(54) MULTI LAYER CERAMIC CAPACITOR

(75) Inventor: Atsushi Masuda, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/524,360

(22) Filed: Mar. 14, 2000

(30) Foreign Application Priority Data

Mar. 19, 1999 (JP) .................................. 11-074785

(51) Int. Cl.$^7$ .................................................. H01G 4/005
(52) U.S. Cl. .................... 361/303; 361/305; 361/311; 361/321.4; 361/306
(58) Field of Search ........................ 361/303, 321.1, 361/321.4, 306, 375, 320, 305, 311, 313, 306.3

(56) References Cited

U.S. PATENT DOCUMENTS

| | | | |
|---|---|---|---|
| 4,803,591 | * 2/1989 | Miyashita et al. | 361/321 |
| 5,093,774 | * 3/1992 | Cobb | 361/306 |
| 5,405,466 | * 4/1995 | Natio et al. | 156/89 |
| 5,600,533 | * 2/1997 | Sano et al. | 361/321.4 |
| 5,835,339 | * 11/1998 | Sakamoto et al. | 361/321.2 |
| 5,933,318 | * 8/1999 | Tomono et al. | 361/323 |
| 6,034,864 | * 3/2000 | Naito et al. | 361/306.1 |
| 6,052,272 | * 4/2000 | Kuroda et al. | 361/303 |
| 6,151,204 | * 11/2000 | Shigemoto et al. | 361/305 |

FOREIGN PATENT DOCUMENTS

| | | |
|---|---|---|
| 4-361513 | 12/1992 | (JP) . |
| 10-172855 | 6/1998 | (JP) . |

* cited by examiner

Primary Examiner—Dean A. Reichard
Assistant Examiner—Nguyen T Ha
(74) Attorney, Agent, or Firm—Flynn, Thiel, Boutell & Tanis, P.C.

(57) ABSTRACT

A multi-layer ceramic capacitor is made up of a laminated body in which ceramic layers and internal electrodes are laminated on one another, and external electrodes are provided at end portions of the laminated body, in which the internal electrodes extend to either one of at least a pair of edges of the ceramic layers opposing each other, thereby leading the internal electrodes to end surfaces of the laminated body opposing each other, respectively, and connecting the internal electrodes led out to the end surfaces of the laminated body to the external electrodes, respectively, whereby internal electrodes facing each other through the ceramic layers within the laminated body through the ceramic layers are formed by conductor particles lying between the ceramic layers end-to-end, along a boundary surface between the ceramic layers, continuously. In the internal electrodes are provided spaces where no conductor particles exist, and the number of conductor particles lying along the boundary surface to the ceramic layers, between adjacent spaces, is equal to or less than 20.

5 Claims, 4 Drawing Sheets

MULTI LAYER CERAMIC CAPACITOR

BACKGROUND OF THE INVENTION

1. Field of the Invention

The present invention relates to a multi-layer ceramic capacitor having, for example, a laminated body of internal electrode patterns and ceramic layers, at end portions of which are provided external electrodes so as to connect with the internal electrodes, and in particular to a multi-layer ceramic capacitor in which de-lamination (i.e., separation between the layers) hardly occurs inside the laminated body.

2. Description of Related Art

In a multi-layer ceramic capacitor, a large number of layers are stacked or laminated, each having an internal electrode and made of dielectric material, wherein the internal electrodes face each other through the ceramic layers within this laminated body, and the above-mentioned internal electrodes extend out to the end surfaces of this laminated body. On the end portions including the end surfaces of the laminated body, to which those internal electrodes extend out, are formed external electrodes, and those external electrodes are connected to the above-mentioned internal electrodes which face each other through the ceramic layers within the laminated body.

The above-mentioned laminated body 3 of the multi-layer ceramic capacitor has a layer construction as shown in FIG. 3, for example. Namely, ceramic layers 7, 7 . . . , each having an internal electrode 5 or 6 and made of a dielectric material, are laminated in the order shown in FIG. 3, and further, on both sides thereof, are stacked or laminated the ceramic layers 7, 7 . . . in a plurality thereof, on which no electrode 5 or 6 is formed. At the end portions of the laminated body 3 having such a layer structure therein, the internal electrodes 5 and 6 are exposed, and as shown in FIG. 1, the above-mentioned external electrodes 2 and 2 are formed at the end portions of this laminated body 3.

Such a multi-layer ceramic capacitor, ordinarily, is not manufactured one by one, in a unit of one part, but actually is obtained by a manufacturing method which will be described below. Namely, first of all, minute ceramic powder and organic binder are mixed to prepare a slurry, which is spread thinly on a carrier film made from a polyethylene terephthalate film, etc., by means of a doctor blade method. Then, it is dried and formed into a ceramic green sheet. Next, this ceramic green sheet is cut out into a desired size by a cutting head, while being mounted on the supporting sheet, and is printed with a conductive paste on one side surface thereof by a screen printing method, and is dried. With this, the ceramic green sheets 1a and 1b are obtained, on each of which plural sets of internal electrode patterns 2a and 2b are aligned or arranged in the vertical and horizontal directions, as shown in FIG. 6.

Next, plural pieces of the ceramic green sheets 1a and 1b, each having the above-mentioned internal electrode patterns 2a and 2b thereon, are stacked or laminated, and further stacked are several pieces of the ceramic green sheets 1, 1 . . . having no internal electrode 2a or 2b, at the top and the bottom surfaces thereof. They are compressed and form the laminated body. Here, the above ceramic green sheets 1a and 1b are stacked on one another, on which the internal electrode patterns 2a and 2b are shifted by half a length in a longitudinal direction thereof. After that, this laminated body is cut into a desired size, thereby to manufacture laminated raw chips, and those raw chips are baked. In this manner are obtained the laminated bodies shown in FIGS. 1 and 3.

Next, this baked laminated body 3 has a conductive paste applied to both ends thereof and is baked, and on the surface of the baked conductive film is provided a treated plating, thereby completing the multi-layer ceramic capacitor formed with external electrodes at both ends thereof, as shown in FIG. 1.

Within the laminated body 3 of the ceramic layers 7 in the multi-layer ceramic capacitor mentioned above, stickiness or adhesiveness between the layers of the internal electrode 5 or 6 and the ceramic layer 7 is worse than the adhesiveness between the ceramic layers 7 themselves. Therefore, when baking the laminated body 3, stresses occur inside the laminated body due to the differences in shrinkage rates and shrinking behaviors and so on, of the internal electrodes 5 and 6 and the ceramic layers 7. Then, in particular on both end portions of the laminated body 3, where the internal electrodes 5 and 6 are led out, there easily occurs a so-called de-lamination, i.e., the ceramic layers 7 peel off one another. Also, fine cracks easily occur inside the laminated body 3.

In particular, in recent years, for obtaining a larger electrostatic capacity but having a small size, the internal electrode 5 or 6 and the ceramic layer 7 have a tendency to be thin in the film thickness thereof. Therefore, with the stress due to the differences in the shrinkage rates and the shrinking behaviors of the internal electrodes 5 and 6 and the ceramic layers 7 when being baked, the laminated body 3 is under a situation that cracks and de-lamination occur more easily therein.

SUMMARY OF THE INVENTION

An object, according to the present invention, for solving the problem in the conventional art mentioned above, is to provide a multi-layer ceramic capacitor, wherein the stress, caused in the laminated body when baking the laminated body due to the differences in the shrinkage rate and the shrinking behavior of the internal electrodes and the ceramic layers 7, is released or mitigated, thereby hardly causing cracking and/or de-lamination inside the laminated body when baking.

According to the present invention, for achieving the above-mentioned object, the internal electrodes 5 and 6 facing each other through the ceramic layers 7 are formed so that conductor particles 8 are connected one by one, along the boundary surface between the ceramic layers 7. With this, the stresses between the internal electrodes 5 and 6 and the ceramic layers 7 are released or mitigated, thereby preventing the laminated body 3 from cracks and de-laminations occurring therein when the laminated body 3 is baked.

Namely, according to the present invention, there is provided a multi-layer ceramic capacitor, comprising:

a laminated body 3 in which ceramic layers 7 and internal electrodes 5 and 6 are laminated on one another; and external electrodes 2 and 2 provided at end portions of the laminated body 3, in which the internal electrodes 5 and 6 opposing each other reach to either one of at least a pair of edges of the ceramic layers 7, thereby leading out the internal electrodes 5 and 6 which oppose each other to either one of the end surfaces of the laminated body 3, and connecting the internal electrodes 5 and 6 led out to the end surfaces of the laminated body 3 to the external electrodes 2 and 2, respectively, whereby the internal electrodes 5 and 6 facing each other through the ceramic layers 7 within the laminated body 3 through the ceramic layers 7 are formed with conductor particles 8, lying between the ceramic layers 7 one by one, along a boundary surface to the ceramic layers 7, successively.

In the above, within the internal electrodes 5 and 6 are provided spaces 9 where no conductor particle exists, and the number of conductor particles 8 lying along the boundary surface to the ceramic layers 7, between an adjacent space 9, is equal to or less than 20. In every space 9 in the internal electrodes 5 and 6, there lie a number of ceramic particles (10) equal to or more than ten. The spaces of the internal electrodes 5 and 6 occupy 25% to 75% of the area of the internal electrodes 5 and 6.

With this multi-layer ceramic capacitor, the internal electrodes 5 and 6, facing each other through the ceramic layers 7 within the laminated body 3, are formed to lie or connect with one by one along the boundary surface between the layers 7, therefore the contact resistance between the internal electrode 5 and 6 and the ceramic layers 7 is small. Further, separation between the conductor particles 8 of the internal electrodes 5 and 6 is also performed with ease, when being baked. With this, the stress between the internal electrodes 5 and 6 and the ceramic layers 7 can be released when the laminated body 3 is baked. Accordingly, the laminated body 3 is prevented from the occurrences of cracks and de-laminations therein, when baked.

Further, in the internal electrodes 5 and 6, facing each other through the ceramic layers 7 within the laminated body 3, there are provided island-like spaces 9 where the conductor particles 8 do not exist partially, and in these spaces 9 are laid the ceramic particles 10 which form the ceramic layers 7. Then, the internal electrodes 5 and 6 and the ceramic layers 7 are bonded mechanically to one another, not only between the layers thereof, but also in the spaces 9. Therefore, even if the film thickness of the internal electrodes 5 and 6 is thin, such as, being equal to or less than 3 i m, separation between the internal electrodes 5 and 6 and the ceramic layers 7, i.e., de-lamination hardly occurs Also, the ceramic layers 7, neighboring each other through the internal electrode 5 or 6 therebetween, are bonded to each other in the spaces 9, the bonding power between the ceramic layers 7 neighboring each other is strengthened, and from this view point, the cracks and de-laminations can be prevented from occurring inside the laminated body, effectively.

From such the fact, it is ideal that a certain amount of ceramic particles lie in the aperture portions 9 of the internal electrodes 5 and 6, and in more details, it is preferable that in every aperture portion of the internal electrodes 5 and 6 lie a number of ceramic particles 10 equal to or more than ten (10). Further, it is necessary that the spaces 9 occupy a certain amount of the area in the internal electrodes 5 and 6, such as around 50% of the internal electrodes 5 and 6, in more details, it is preferable to occupy from 25% to 75% of the area thereof. If the ratio of the area the spaces 9 occupy within the internal electrodes 5 and 6 is less than 25%, it is difficult to obtain the anchor effect mentioned above, then the occurrences of the cracks and de-laminations cannot be prevented sufficiently. Also, if the ratio of the area the spaces 9 occupy within the internal electrodes 5 and 6 exceeds 75%, the opposing area between the internal electrodes 5 and 6 decreases, therefore it is difficult to obtain the desired electrostatic capacitance therewith.

In this manner, in the multi-layer ceramic capacitor according to the present invention, the contact resistance at the boundary surface between the internal electrode 5 or 6 and the ceramic layers 7 is small, thereby releasing the stress occurring when the laminated body is baked, due to the difference in the shrinkage rate or factor between the internal electrodes 5 and 6 and the ceramic layers 7. Accordingly, it is possible to obtain a multi-layer ceramic capacitor wherein defects, such as cracks and de-laminations, hardly occur within the laminated body thereof.

DESCRIPTION OF THE PREFERRED EMBODIMENTS

Hereinafter, detailed and specific explanation of the embodiments according to the present invention will be given by referring to the attached drawings.

First of all, powder of a dielectric ceramic material, such as barium titanate, for example, is dispersed into organic binder, such as acryl or the like, dissolved in a solvent, such as ethanol, etc., to prepare a ceramic slurry. This ceramic slurry is pasted or applied thinly, onto a base film made from a polyethylene terephthalate film or the like, with a constant thickness, and is dried, thereby producing a film-like ceramic green sheet. After that, this ceramic green sheet is cut out into an appropriate size.

Figure 6:
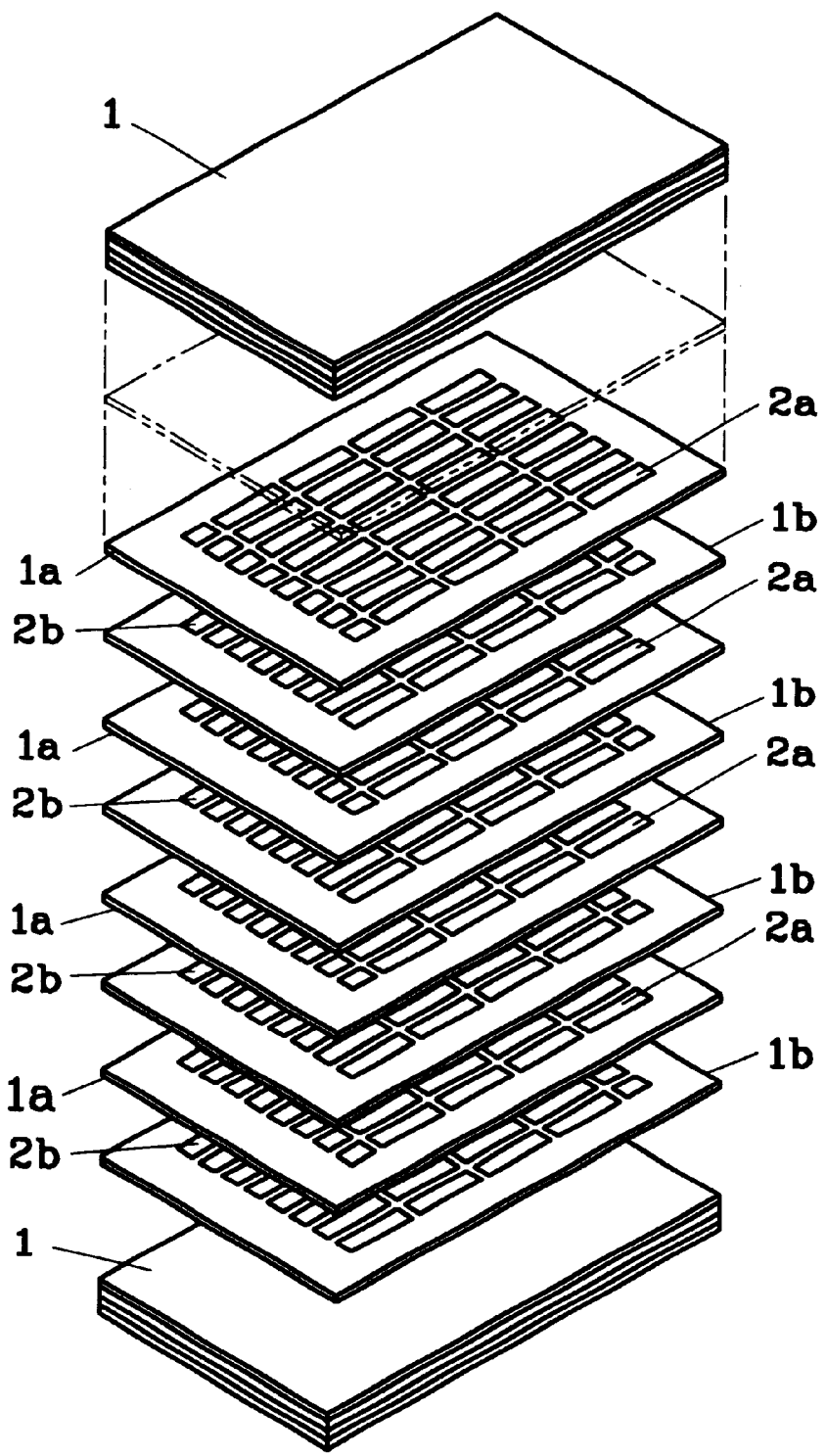
FIG. 6 is an exploded view for showing a condition of laminating of a ceramic green sheets for manufacturing the multi-layer ceramic capacitor.

Next, as shown in FIG. 6, on the cut ceramic green sheets 1a and 1b, two (2) kinds of internal electrode patterns 2a and 2b are printed, respectively, by using a conductive paste. For example, the conductive paste is obtained by adding a powder of 100 weight % of Ni, Cu, Ag, Pd, Ag—Pd, into a binder of 3–12 weight % of ethyl cellulose, acryl, polyester, etc., a solvent of 80–120 weight % of butyl carbitol, butyl carbitol acetate, terpineol, ethyl cellosolve, hydrocarbon, etc., and barium titanate as a so-called common material, 5–30 weight % thereof, and is mixed and dispersed equally, to be used. The metal particles, such as Ni to be dispersed in the conductive paste, are 0.2 i m to 1.0 i m in mean particle diameter.

By using a conductive paste, such as a Ni paste, the internal electrode patterns 2a and 2b are printed on the ceramic green sheets 1a and b, with a thickness of from 0.5 i m to 2.0 i m, respectively. By doing so, the number of conductor particles comes to be 1 to 3 briefly, lying in a direction of the thickness of the internal electrode patterns 2a and 2b when being printed.

The ceramic green sheets 1a and 1b, on which the internal electrode patterns 2a and 2b are printed, are stacked on one another, as shown in FIG. 6, and on both sides (i.e., an upper side and a lower side) thereof are further stacked ceramic green sheets 1 and 1, on which no internal electrode pattern 2a or 2b is printed, i.e., dummy sheets, and then they are compressed to the laminated body. Further, this laminated body is cut in vertical and horizontal directions, and separated into chip-like laminated bodies. After that, through baking of those laminated bodies, the baked laminated bodies 3, having the layer structure as shown in the FIG. 3, can be obtained.

Figure 3:
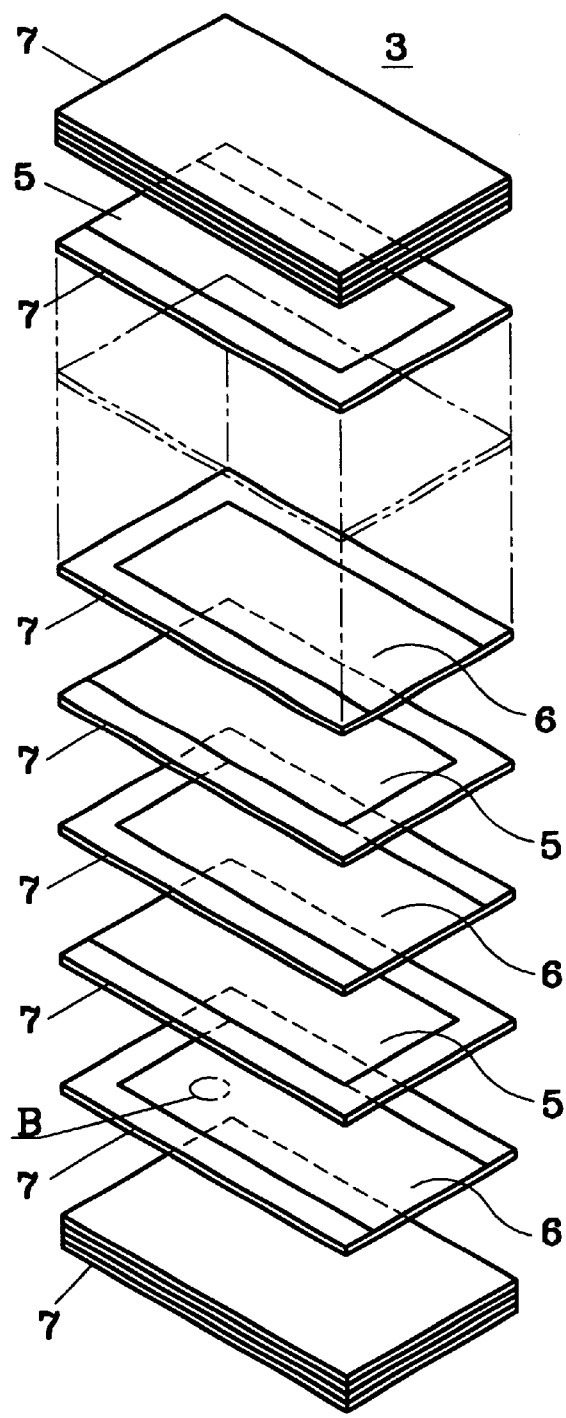
FIG. 3 is an exploded view for showing the layers of a laminated body, in an example of the above multi-layer ceramic capacitor.

As shown in FIG. 3, the ceramic layers 7, 7 . . . , each made of a dielectric material and having an internal electrode 5 or 6, are laminated in the laminated body 3, and on both sides thereof are stacked a plurality of ceramic layers 7, 7 . . . , on which no internal electrode 5 or 6 is formed. In the laminated body 3, the internal electrodes 5 and 6, facing each other through the ceramic layers 7, are led out to both end surfaces of the laminated body 3, alternately.

Figure 1:
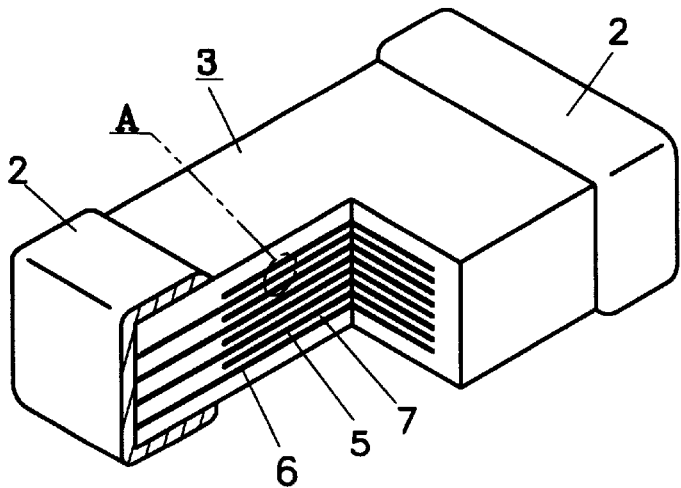
FIG. 1 is a perspective view of a multi-layer ceramic capacitor according to the present invention, a portion of which is cut out.

As shown in FIG. 1, on both ends of the laminated body 3, where the respective internal electrodes 5 and 6 are led out, a conductive paste, such as Cu paste, is applied and baked thereon. Further, on the conductive film, there are treated Ni plating and Sn or solder plating, thereby forming external electrodes 2 and 2. With this, the multi-layer ceramic capacitor is completed.

In the baking process of the laminated bodies mentioned above, when the internal electrodes 5 and 6 are baked, there first occurs the re-arrangement of metal particles of the conductive paste which forms the internal electrodes, thereby the conductor particles forming the internal electrode patterns grow in a direction of a boundary surface between the ceramic layers 7. With this, as shown in FIG. 2, the conductor particles 8 forming the internal electrodes 5 and 6 are re-formed as flat particles grown in the boundary surface between the ceramic layers 7, and the internal electrodes 5 and 6 are formed under the condition that, the flat conductor particles are lying or connected one by one in the boundary surface between the ceramic layers 7.

As methods for controlling the size or the like of the conductor particles, there can be listed a composition of the conductive paste for use in forming the internal electrodes (amount of metal, amount of the common material, and amount of the binder), and/or adjusting the particle diameter or a baking profile thereof.

Figure 2:
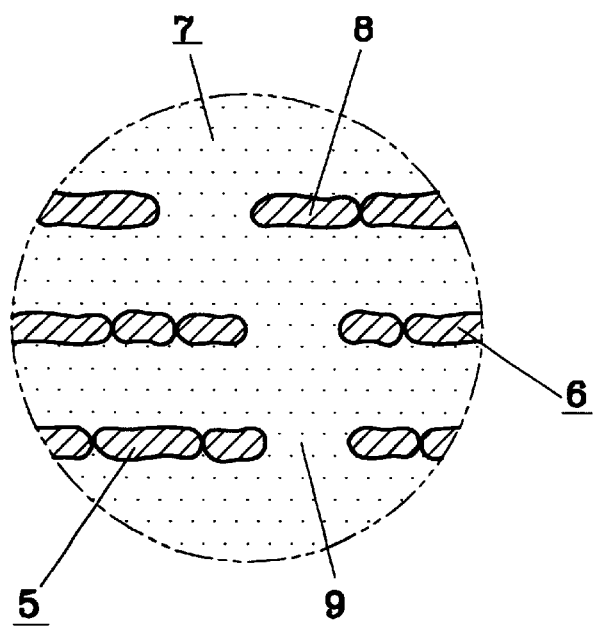
FIG. 2 is an enlarged cross-section view of a principle portion, in particular showing a portion A in the FIG. 1 of the above multi-layer ceramic capacitor.

FIG. 2 shows a photomicrograph diagrammatically, which is obtained by observing, by means of an optical microscope, the cross-section of the ceramic layers 7, which is exposed or cut out by grinding the completed multi-layer ceramic capacitor in a direction orthogonal to a direction of lamination of the ceramic layers 7, under the condition that it is buried into an acryl resin to be held firmly therein. Namely, it just corresponds to an enlarged view of a portion A in FIG. 1.

As shown in FIG. 2, the internal electrodes 5 and 6 are formed so that the flat conductor particles are lying or connected one by one in a line in the boundary direction between the ceramic layers 7. However, those internal electrodes 5 and 6 are not connected nor continued perfectly in every part thereof, and there are formed island-like spaces 9 where no conductor layer exists. The number of the conductor particles 8 connected between the neighboring spaces is no more than 20.

Figure 4:
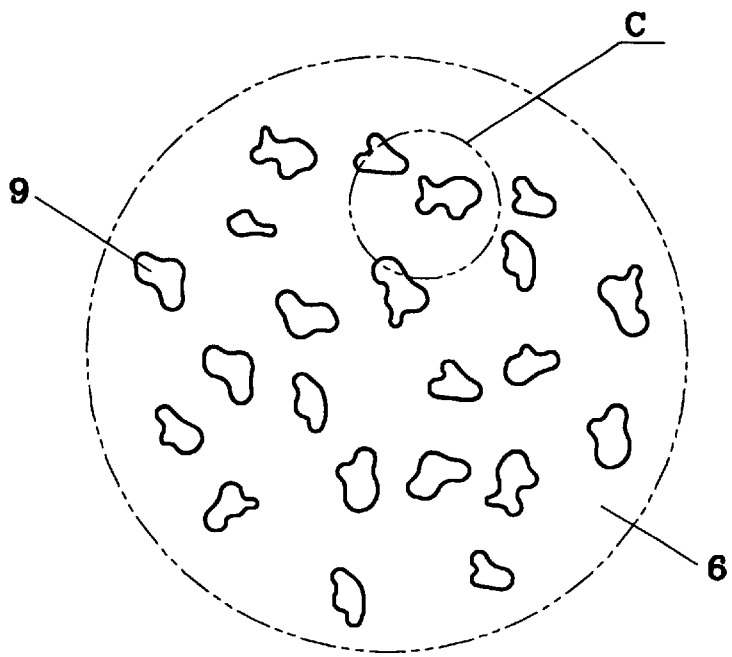
FIG. 4 is an enlarged cross-section view of a principle portion, in particular showing a portion B in the FIG. 3 of the above multi-layer ceramic capacitor.
Figure 5:
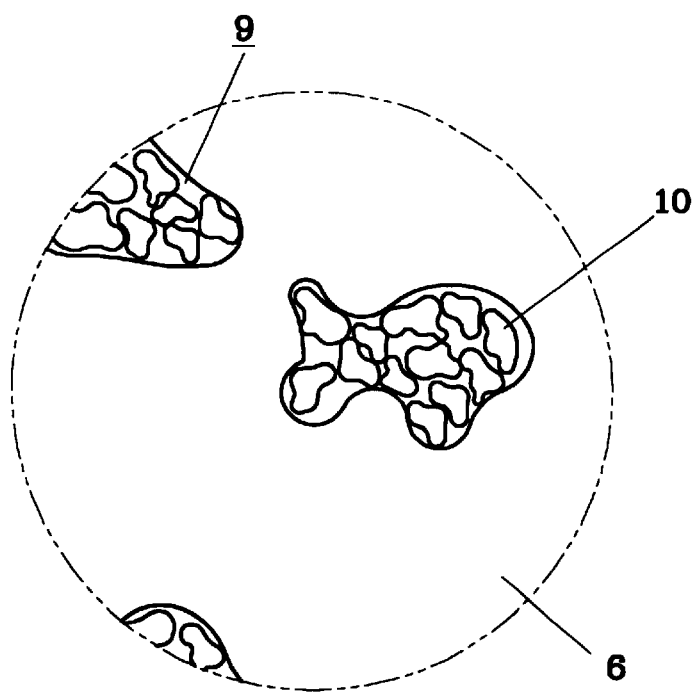
FIG. 5 is an enlarged cross-section view of a principle portion, in particular showing a portion C in the FIG. 4 of the above multi-layer ceramic capacitor.

FIG. 4 shows a photomicrograph diagrammatically, which is obtained by observing by means of an optical microscope a cross-section of the ceramic layers 7, which is exposed by grinding the completed multi-layer ceramic capacitor in the lamination direction of the ceramic layers 7, under the condition that it is buried into an acryl resin to be held firmly therein. Namely, it just corresponds to an enlarged view of a portion B in FIG. 3. Further, FIG. 5 is an enlarged view for showing a portion C in FIG. 4, diagrammatically.

As shown in those Figures, in the spaces 9 where no conductor film exists, the ceramic particles 10 are laid. The number of ceramic particles lying per space 9 is 10 or more. Also, the spaces 9 of the internal electrodes 5 and 6 occupy around 50% of the internal electrodes 5 and 6, in more detail, from 25% to 75%, of the area thereof.

Next, explanation will be given on a specific example and a comparison thereto.

EXAMPLE

Powder of dielectric ceramic material, such as barium titanate, for example, is dispersed into an organic binder, such as acryl or the like, dissolved into a solvent, such as ethanol, etc., thereby to prepare a ceramic slurry. This ceramic slurry is pasted or applied thinly, on a base film made from a polyethylene terephthalate film or the like, with a constant thickness of 10 i m, and is dried, thereby producing a film-like ceramic green sheet. After that, this ceramic green sheet is separated from the base film, and is cut out into a plurality of ceramic green sheets of 150 mm×150 mm.

Into powder of 100 weight % of Ni of mean particle diameter 0.2 i m–1.0 i m are added a binder of 8 weight % of ethyl cellulose, a solvent of 100 weight % of terpineol, and barium titanate powder of 15 weight % thereof, and they are mixed and dispersed equally, thereby preparing the conductive paste. By using this Ni paste, internal electrodes 1a and 1b are formed on the ceramic green sheets, respectively, by means of a screen printing apparatus, with a thickness of 0.5 i m–2 i m.

The ceramic green sheets, on which the internal electrode patterns are printed, are stacked on one another, in a predetermined number of pieces thereof, and on the upper and lower sides thereof are further stacked the ceramic green sheets, on which no internal electrode pattern is printed, i.e., the dummy sheets, and then they are compressed in the laminating direction by a pressure of 200 t, under a temperature of 120° C., for the bonding thereof, thereby obtaining the laminated body.

This laminated body is cut out into a size 5.3 mm×5.0 mm, and those laminated bodies are baked at a temperature of 1,320° C., thereby obtaining the baked laminated bodies 3 as shown in FIG. 3. Further, on both ends of the baked laminated body, Cu paste is applied and baked thereon. Thereafter, the chips are put into an electrolysis barrel plating container, to be treated with an Ag film plating process thereon, and after that, on the Ag film are formed treated Ni plating and Si plating, sequentially. With this, the external electrodes 2 and 2 are formed, and the multi-layer ceramic capacitors as shown in FIG. 1 is obtained.

With fifty (50) pieces of the multi-layer ceramic capacitors, a laminating condition between the internal electrodes 5 and 6 and the ceramic layers 7 is observed by the optical microscope, upon a plane surface cut off and exposed by grinding each of them in a direction orthogonal to the laminating direction of the internal electrodes 5 and 6, under the condition that it is buried into the acryl resin to be held firmly therein. As a result of this, as shown in FIG. 2, the internal electrodes 5 and 6 are formed so that the flat conductor particles are laid or connected about one by one in a line, on the boundary surface between the ceramic layers 7, and there are formed island-like spaces 9 where no conductor layer exists. The number of the conductor particles 8 connected between the neighboring spaces 9 is 20 at the maximum.

Further, with another fifty (50) pieces of the multi-layer ceramic capacitors, the laminating condition of the ceramic layers 7 is also observed by the optical microscope, upon a plane surface cut off and exposed by grinding each of them in a laminating direction of the internal electrodes 5 and 6, under the condition that it is buried into the acryl resin to be held firmly therein. As a result of this, as shown in FIG. 5, the internal electrodes 5 and 6 are formed so that the flat conductor particles are lying or connected one by one in a line, on the boundary surface between the ceramic layers 7, and there are formed island-like spaces 9 where no conductor layer exists. The area of these spaces 9 occupying the plane surface of the electrodes 5 and 6 is about 49%. In each portion of those spaces 9 are laid at least 10 of the ceramic particles 10.

Studying cracks and separation of the ceramic layers 7 inside the laminated bodies 3, i.e., existence of de-lamination, on one hundred (100) of the multi-layer ceramic capacitors in total, no cracking nor de-lamination can be acknowledged to occur therein. Further, with using the other fifty (50) pieces of the multi-layer ceramic capacitors, which are manufactured in the same time, the external electrodes 2 and 2 at both ends thereof are soldered on land electrodes on a circuit board, and thereafter, those multi-layer ceramic capacitors are ground. Studying the cracking and the separation of the ceramic layers 7 inside the laminated body 3 in the same manner, no cracking nor de-lamination can be acknowledged to occur therein.

Comparison

The multi-layer ceramic capacitors are manufactured in the same manner as the above Example, but the content of the common material of the Ni paste for forming the internal electrodes 5 and 6 is 3 weight % with respect to 100 weight % of Ni powder, and further that a rise-up slope or inclination of temperature is set to be slow when baking of the cut-out chips.

With fifty (50) pieces of those multi-layer ceramic capacitors, the laminating condition between the internal electrodes 5 and 6 and the ceramic layers 7 is observed by the optical microscope, upon a plane surface cut off by grinding each of them in a direction orthogonal to the laminating direction of the internal electrodes 5 and 6, under the condition that it is buried into the acryl resin to be held firmly therein. As a result of this, although the internal electrodes 5 and 6 are formed so that the conductor particles are laid or connected one by one in a line, on the boundary surface between the ceramic layers 7, however the island-like spaces 9 where no conductor film exists are formed sparsely here and there in the internal electrodes 5 and 6. There are many portions where the number of conductor particles 8 connected between the neighboring spaces 9 is 20 or more.

Further, with another fifty (50) pieces of multilayer ceramic capacitors, the laminating condition of the ceramic layers 7 is also observed by the optical microscope, upon a plane surface being cut off to be exposed by grinding each of them in the laminating direction of the internal electrodes 5 and 6, under the condition that it is buried into the acryl resin to be held firmly therein. As a result of this, although there are formed island-like spaces 9 where no conductor layer exists, however, the ratio thereof occupying the plane surface of the electrodes 5 or 6 is about 23%. The number of ceramic particles 10 lying in each portion of those spaces 9 is nine (9) or less.

Studying cracking and separation of the ceramic layers 7 inside the laminated bodies 3, i.e., existence of de-lamination, on one hundred (100) of the multi-layer ceramic capacitors in total, no cracking nor de-lamination can be acknowledged to occur therein. Further, by using the other fifty (50) pieces of the multi-layer ceramic capacitors, which are manufactured at the same time, the external electrodes 2 and 2 at the both ends thereof are soldered on land electrodes on a circuit board, and thereafter, those multi-layer ceramic capacitors are ground. Studying the cracking and the separation of the ceramic layers 7 inside the laminated body 3 in the same manner, there can be acknowledged cracking and/or de-lamination in eighteen (18) pieces.

However, though the external electrodes are baked on the raw or bare body after baking thereof in the embodiment mentioned above, the present invention should not be restricted only to that, and the external electrodes and the raw or bare body can be baked at the same time, so as to obtain the same effect therewith.

What is claimed is:

1. A multi-layer ceramic capacitor comprising:
   a laminated body formed by ceramic layers and internal electrodes laminated on each other and
   external electrodes provided at opposite end portions of the laminated body, wherein opposing internal electrodes are in electrical connection with opposite external electrodes, the internal electrodes are formed by conductor particles provided in end-to-end relationship along a boundary surface between adjacent ceramic layers and spaces are provided between some of the conductor particles.

2. The multi-layer ceramic capacitor of claim 1, wherein the number of conductor particles provided between adjacent spaces is no greater than 20.

3. The multi-layer ceramic capacitor of claim 2, wherein at least 10 ceramic particles are provided in each space.

4. The multi-layer ceramic capacitor of claim 2, wherein the spaces occupy 25–75% of the area of the internal electrodes.

5. The multi-layer ceramic capacitor of claim 3, wherein the spaces occupy 25–75% of the area of the internal electrodes.

* * * * *